Patented July 8, 1941

2,248,241

UNITED STATES PATENT OFFICE 2,248,241

METHOD OF PREPARING ALKALOIDS FROM KOTO-TSUZURAFUJI (STEPHANIA SASAKII, HAYATA)

Heisaburo Kondo, Shibuya-ku, and Shuji Hasegawa, Ebara-ku, Tokyo, Japan

No Drawing. Application June 4, 1940, Serial No. 338,740

1 Claim. (Cl. 260—236)

The present invention relates to a method of preparing alkaloids from "Koto-tsuzurafuji" (Stephania sasakii, Hayata), which comprises in combination the step of firstly preparing alcohol extract of "Koto-tsuzurafuji" (Stephania sasakii, Hayata), a plant of the Menispermaceae family found in Japan, obtaining all the alkaloids by treating the above extract with a mineral acid, alkali and organic solvent and next dividing them into non-phenolic bases and phenolic bases and the step of separating cepharanthine from the other non-phenolic bases as a benzol or toluene additional compound.

The object of this invention is to provide a remedy for tuberculous diseases by separating in a pure state all the alkaloids contained in "Koto-tsuzurafuji."

It is known to separate the main alkaloid, cepharanthine (whose pharmacological action is explained in applicant's U. S. patent application No. 216,286) and the secondary base, isotetrandrin from "Tamasaki-tsuzurafuji" (Stephania cepharantha, Hayata), a plant of the Menispermaceae family found in Japan. The separation of the above isotetrandrin also is described in said U. S. application.

In "Koto-tsuzurafuji," a plant of the Menispermaceae family found in Japan, we have discovered as the main alkaloid, cepharanthine which is exactly the same with the main alkaloid of "Tamasaki-tsuzurafuji" and other unknown four alkaloids. That is to say, we have found that the material of a remedy for tuberculous diseases cepharanthine is not only "Tamasaki-tsuzurafuji," but also may be "Koto-tsuzurafuji" (Stephania sasakii, Hayata).

The following is an example of performing the present invention:

Cut the rhizoma of "Koto-tsuzurafuji" (Stephania sasakii, Hayata) into small pieces and prepare alcohol extract with alcohol of the quantity 5 times as big. After the addition of 2% hydrochloric acid of the quantity 10 times as big, lixiviate the mixture several times to dissolve the base in hydrochloric acid. Further, by the addition of ammonia, render the hydrochloric solution alkaline and extract the thus-separated base with ether. Then, distil the solvent from the ether solution extracted with ether, and all the alkaloids contained in "Koto-tsuzurafuji" (Stephania sasakii, Hayata) will be obtained as amorphous powder.

As to the yield, 3 kilograms of the extract and also 300 grams of the total alkaloids are obtained from 20 kilograms of the air dry drug.

Next, dissolve 300 grams of all the alkaloids in dilute hydrochloric acid and render it alkaline by the addition of caustic soda. Then, extract the thus-separated precipitate with ether. If the solvent is removed from the ether solution, 180 grams of non-phenolic bases will be obtained in all. Dissolve the same in aceton and leave the solution alone with the addition of benzol, and then the benzol additional compound of cepharanthine will be obtained as colorless needle-shaped crystals of the decomposing point 103° C. The yield is 42 grams. If in the above case toluene is employed in place of benzol, a toluene additional compound of cepharanthine is obtained as colorless needle-shaped crystals of the decomposing point 98° C. with the yield of 40 grams.

Next, after dissolving this benzol or toluene additional compound of cepharanthine in 10% acetic acid, concentrating the solution slightly under reduced pressure and removing benzol or toluene therefrom, it is rendered alkaline by the addition of ammonia and the thus-separated base is extracted with ether. If the solvent is distilled away from the ether solution, the main alkaloid, cepharanthine, will be obtained as colorless powder. The yield substantially agrees with the theory. The thus-obtained pure cepharanthine has the melting point of 155° C. and the result of analysis shows it as agreeing with $C_{37}H_{38}N_2O_6$.

As regards the benzol-aceton (or toluene-aceton) mother liquor from which cepharanthine has been removed as a benzol or toluene additional compound, if the residue obtained after the solvent is distilled is dissolved in dilute hydrochloric acid and left alone in weak acidic condition, the hydrochloride of the second alkaloid (decomposing point 225° C.) will be separated as colorless needle-shaped crystals with the yield of 20 grams. Dissolve it in water and render it alkaline by the addition of ammonia and extract it with ether. Then, distil away ether, and the second alkaloid will be obtained as colorless needle-shaped crystals of the melting point 117° C. The yield is 15 grams. The result of analysis shows it as agreeing with $C_{38}H_{40}N_2O_7$.

The mother liquor from which the hydrochloride of the second alkaloid has been separated is rendered alkaline by the addition of ammonia and extracted with ether. Distil away the solvent, and the third alkaloid will be obtained as light yellow amorphous powder.

On the other hand, when the dilute hydrochloride solution of all the alkaloids contained in "Koto-tsuzurafuji" (*Stephania sasakii*, Hayata) are rendered alkaline by the addition of caustic soda and the caustic alkaline mother liquor from which non-phenolic bases have been removed with ether, is saturated with carbondioxide gas, phenolic bases will be separated. If these phenolic bases are extracted with ether and the ether solution has the solvent removed therefrom, about 100 grams of the phenolic bases will be obtained in all. Leave them alone after the addition of methanol, and the fourth alkaloid will be obtained as colorless needle-shaped crystals of the melting point 210° C. with the yield of about 4 grams. According to the result of analysis, this substance is equivalent to $C_{36}H_{36}N_2O_7$.

If the solvent is removed from the methanol mother liquor from which the fourth alkaloid has been separated, the fifth one will be got. It is a light yellow amorphous substance and has not yet been examined fully.

We claim:

The method of preparing alkaloids from "Koto-tsuzurafuji" (*Stephania sasakii*, Hayata) which consists in extracting the rhizoma of "Koto-tsuzurafuji" with alcohol, lixiviating the extract with HCl to dissolve the base in HCl, rendering the hydrochloric solution alkaline with ammonia, extracting the thus separated base with ether, removing the ether, dissolving the resulting crude alkaloid in HCl, alkalizing with caustic soda, extracting the resulting precipitate with ether, removing the ether from the ether extract, dissolving the resulting non-phenolic bases in acetone with addition of a benzene compound of the group consisting of benzene and toluene and allowing to stand until the addition product of cepharanthine and benzene compound separates.

HEISABURO KONDO.
SHUJI HASEGAWA.